US007614140B2

(12) United States Patent
Cheng et al.

(10) Patent No.: US 7,614,140 B2
(45) Date of Patent: Nov. 10, 2009

(54) APPARATUS FOR PROVIDING C-CLIPS TO PINS

(75) Inventors: Tung-Jung Cheng, Taichung Hsien (TW); Eric Tsai, Taichung Hsien (TW)

(73) Assignee: Apex Mfg. Co., Ltd., Taichung Hsien (TW)

( * ) Notice: Subject to any disclaimer, the term of this patent is extended or adjusted under 35 U.S.C. 154(b) by 1261 days.

(21) Appl. No.: 10/987,534

(22) Filed: Nov. 12, 2004

(65) Prior Publication Data

US 2006/0106404 A1 May 18, 2006

(51) Int. Cl.
*B23Q 7/10* (2006.01)

(52) U.S. Cl. .......................... 29/809; 29/811.2; 29/242; 29/243.56; 227/120; 227/134

(58) Field of Classification Search .................. 29/809, 29/811.2, 814, 816, 818, 222, 242, 243.56, 29/269, 270, 284; 227/120, 127, 134
See application file for complete search history.

(56) References Cited

U.S. PATENT DOCUMENTS 4,050,578 A * 9/1977 Eckert ........................ 206/340
4,953,384 A * 9/1990 Baillet et al. ............. 72/409.06
5,890,642 A * 4/1999 Sato ........................... 227/134
6,318,619 B1 * 11/2001 Lee ............................ 227/134
6,722,007 B2 * 4/2004 Lin ............................. 29/268
6,722,011 B1 * 4/2004 Bacon ......................... 29/451
2004/0020023 A1 * 2/2004 Hsu ........................ 29/243.56

* cited by examiner

*Primary Examiner*—Jermie E Cozart
(74) *Attorney, Agent, or Firm*—Alan Kamrath; Kamrath & Associates PA

(57) ABSTRACT

An apparatus includes a cartridge for storing C-clips. The cartridge includes two lateral members and a lower member extending between the lateral members. The lateral members extend beyond the lower member by at least the thickness of the C-clips so that first one of the C-clips can be moved past the lower member. A saddle is movably connected with the lower member for carrying some of the C-clips. The saddle includes a slope for contact with the first one of the C-clip. Thus, the saddle is moved as the first one of the C-clips is moved. A pocket is connected with the cartridge below the saddle for receiving a pin. A pusher is put movably in the cartridge for pushing the C-clips. An elastic element biases the pusher. A shell receives the cartridge. A hammering device forces the first C-clip onto the pin against the slope.

30 Claims, 7 Drawing Sheets

APPARATUS FOR PROVIDING C-CLIPS TO PINS

FIELD OF INVENTION

The present invention relates to an apparatus for providing C-clips onto pins.

BACKGROUND OF INVENTION

Referring to FIG. 7, a conventional apparatus 800 has been disclosed for providing a C-clip 830 to a pin 840. In general, the apparatus 800 is configured like a pair of scissors. The apparatus 800 includes two handles 810 pivotally connected with each other, two jaws 812 each extending from one handle 810 and two teeth 825 each pivotally connected with one jaw 812. In use, each tooth 825 is inserted in an aperture 831 defined in each end of a C-clip 830. The handles 810 are spread in order to expand the C-clip 830. Thus, the C-clip 830 can be provided to the pin 840 and, more particularly, in a groove (not shown) defined in the pin 840. It however causes troubles for a user to spread the handles 810 with two hands. Moreover, the user needs strength to keep the handles 810 spread against a recovering force exerted by the C-clip 830. Furthermore, the user needs skills to keep the C-clip 830 expanded with the apparatus 800 because the teeth 825 tend to escape the apertures 831.

The present invention is therefore intended to obviate or at least alleviate the problems encountered in prior art.

SUMMARY OF INVENTION

According to the present invention, an apparatus includes a cartridge for storing C-clips. The cartridge includes two lateral members and a lower member extending between the lateral members. The lateral members extend beyond the lower member by at least the thickness of the C-clips so that first one of the C-clips can be moved past the lower member. A saddle is movably connected with the lower member for carrying some of the C-clips. The saddle includes a slope for contact with the first one of the C-clip. Thus, the saddle is moved as the first one of the C-clips is moved. A pocket is connected with the cartridge below the saddle for receiving a pin. A pusher is put movably in the cartridge for pushing the C-clips. An elastic element biases the pusher. A shell receives the cartridge. A hammering device forces the first C-clip onto the pin against the slope.

An advantage of the present invention is that a user can easily operate it with one hand. Another advantage of the present invention is that the user consumes little energy in operating it for not having to keep a C-clip expanded. Another advantage of the present invention is that the user needs almost no skill to provide a C-clip onto a pin.

Other objects, advantages and novel features of the invention will become more apparent from the following detailed description in conjunction with the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
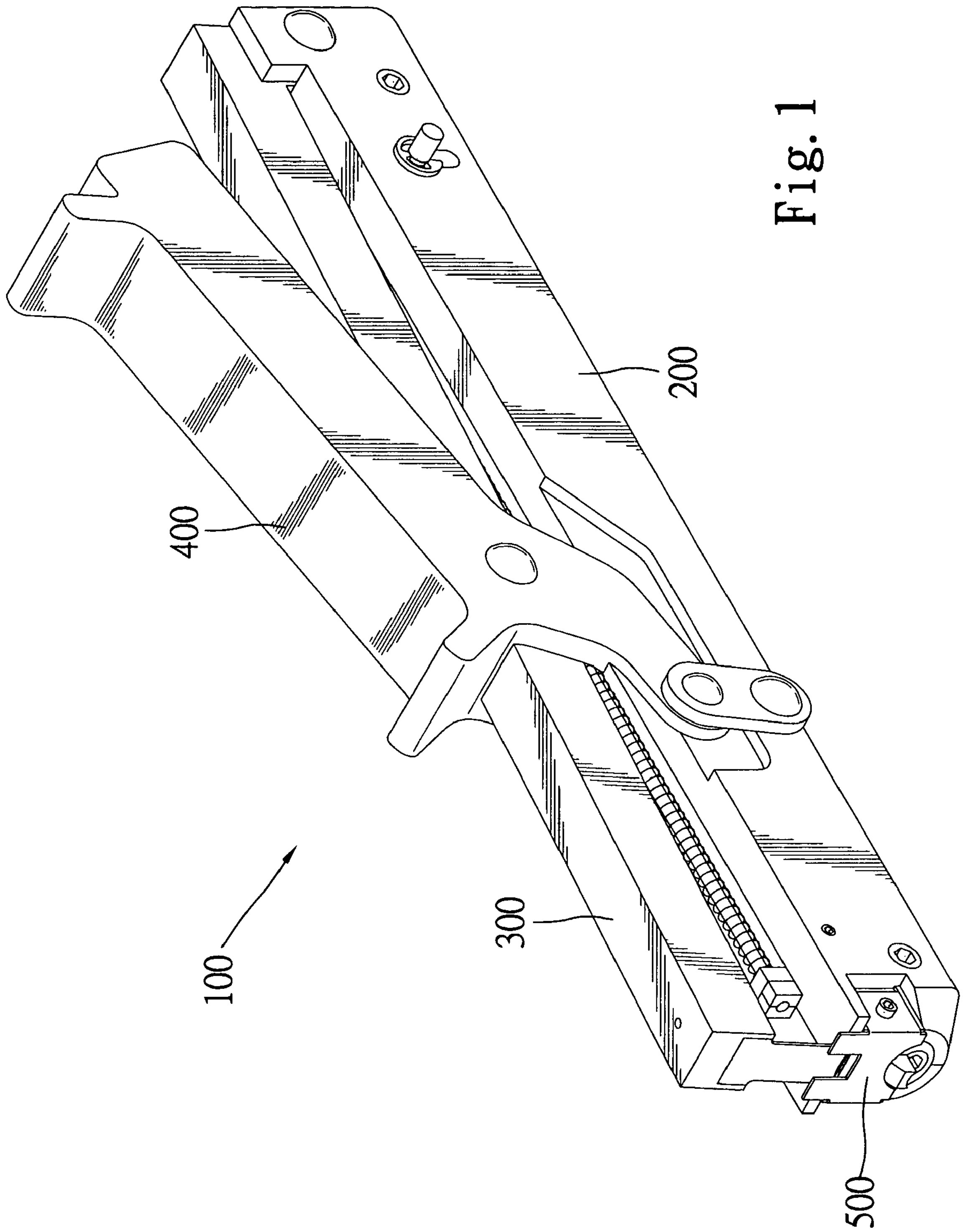
FIG. 1 is a perspective view of an apparatus for providing C-clips onto pins according to the present invention.

Referring to the drawings, according to the preferred embodiment of the present invention, an apparatus 100 is disclosed for providing C-clips 620 onto pins 612.

Figure 2:
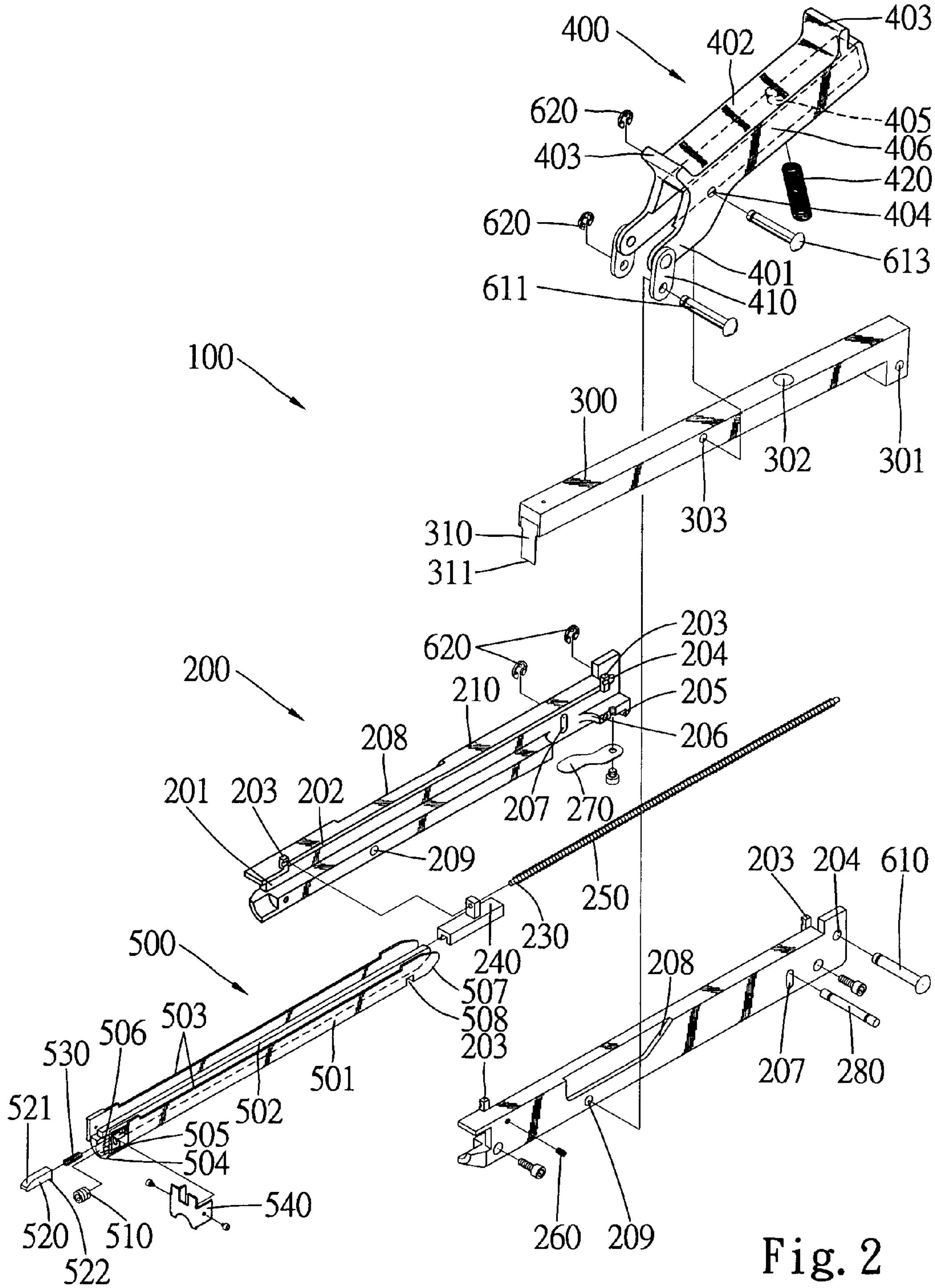
FIG. 2 is an exploded view of the apparatus shown in FIG. 1.
Figure 3:
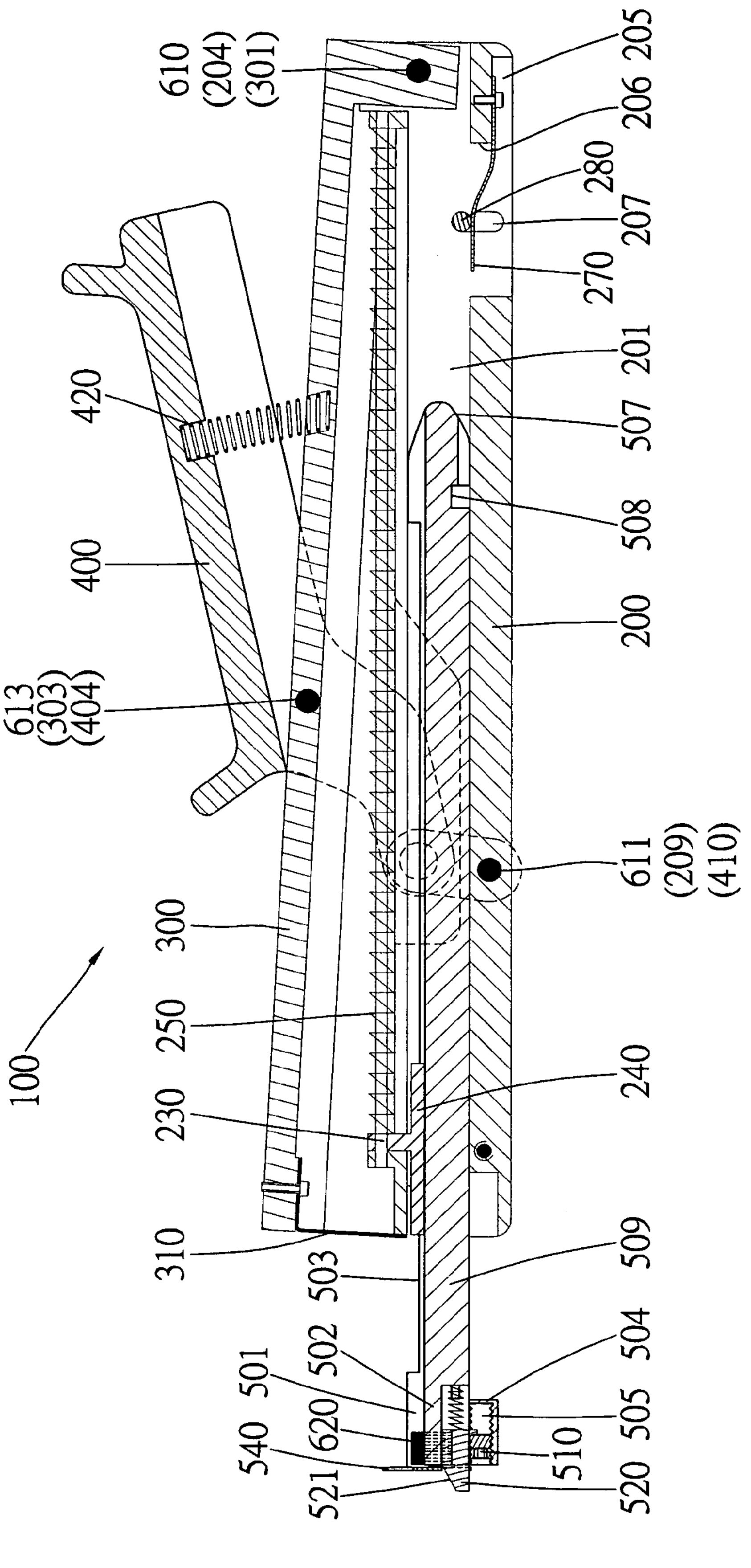
FIG. 3 is a cross-sectional view of the apparatus shown in FIG. 1.

Referring to FIGS. 2 and 3, the apparatus 100 includes a cartridge 500 for storing the C-clips 620. The cartridge 500 includes a lower member 509, a rail 502 extending on the lower member 509 and two lateral members 501 between which the lower member 509 extends. The rail 502 extends longer than the lower member 509. The lateral members 501 extend longer than the rail 502 by the thickness of each C-clip 620.

The lower member 509 includes a slope 507 formed on a lower face at an end thereof and a recess 508 defined in the lower face thereof. A recess 503 is defined in the upper edge of each lateral member 501.

A space 506 is defined between the lateral members 501, below the rail 502, before the lower member 505. The C-clips 620 is put in the space 506. A restraint 540 is attached to the lateral members 501 in order to keep the C-clips 620 in the space 506. A spring 530 is put in the space 506. The spring 530 is fit on an extension extending from an opposite end of the lower member 509. A saddle 520 is pushed by means of the spring 530 in order to support the C-clips 620. The saddle 520 includes a slope 521 formed on an upper face thereof at an end. The C-clips 620 can slide on the slope 521. The saddle 520 includes a hook 522 formed on a lower face thereof at an opposite end.

Figure 5:
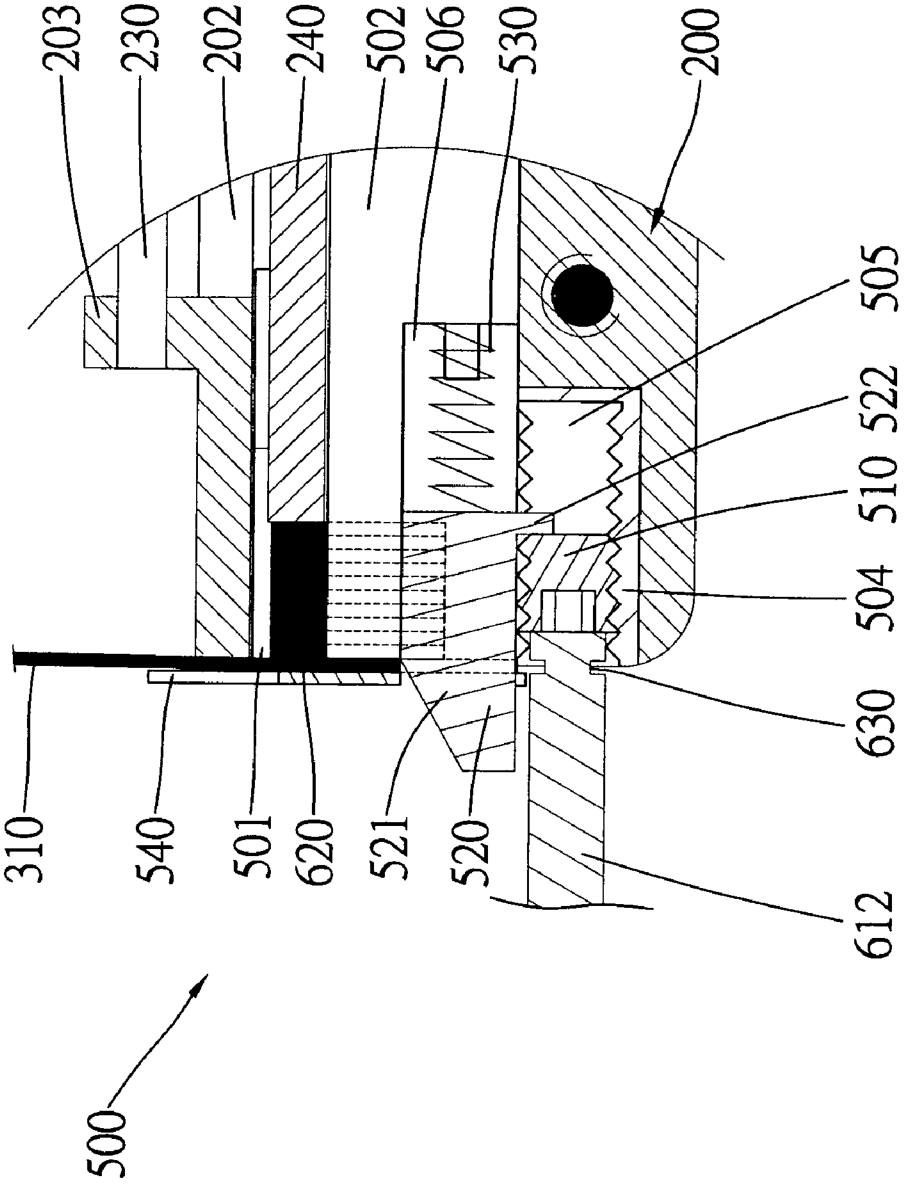
FIG. 5 is an enlarged partial cross-sectional view of the apparatus shown in FIG. 1.
Figure 6:
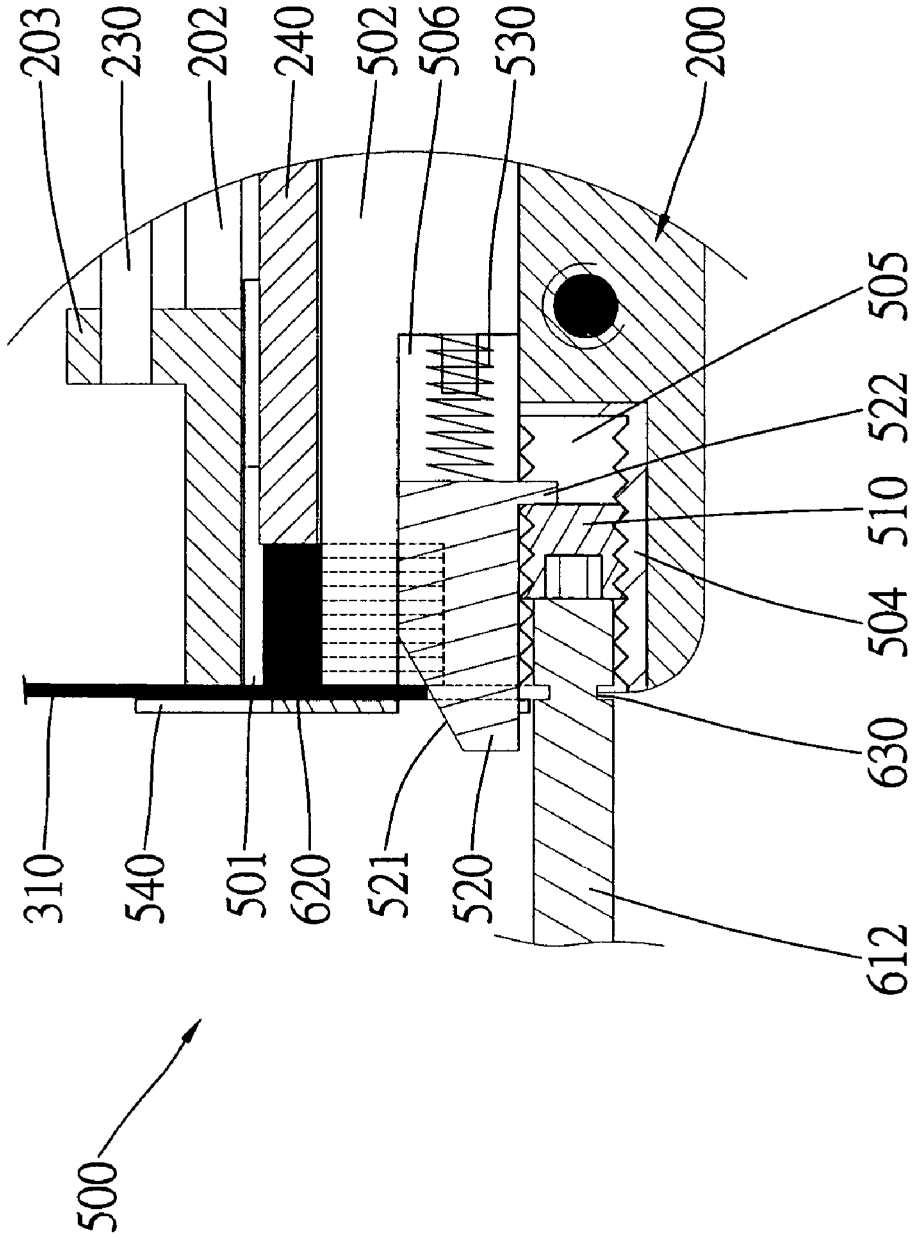
FIG. 6 is similar to FIG. 5 but shows the apparatus in another position.
Figure 7:
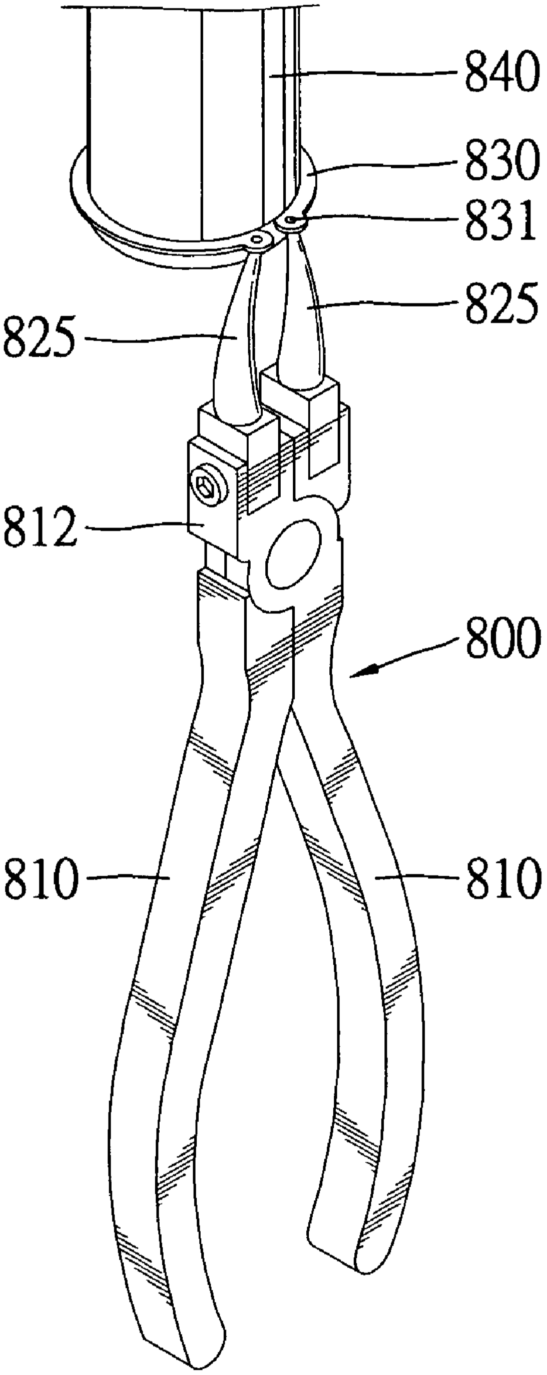
Fig. 7 PRIOR ART
FIG. 7 is perspective view of a conventional apparatus for providing a C-clip onto a pin.

Between the lateral members 501 is formed a pocket 504 defining a space 505 for receiving the pins 612 referring to FIGS. 5 and 6. An adjustor 510 is put in the space 505 for adjusting an effective length of the space 505. The adjustor 510 may be a screw engaged with a thread (not numbered) formed on the internal wall of the pocket 504. The hook 522 of the saddle 520 can hook the adjustor 510 in order to keep the saddle 502 between the lateral members 501.

A pusher 240 is put on the rail 502 movably. A spring 250 biases the pusher 240. A rod 230 is inserted through the spring 250 so that the spring 250 is supported by means of the rod 230. Further, the rod 230 is inserted through an aperture (not numbered) defined in the pusher 240.

A shell 200 consists of two halves 210. The shell 200 defines a space 201 for receiving the cartridge 500 and the pusher 240. A restraint 260 is inserted in each recess 503 through an aperture (not numbered) defined in one half 210. Thus, the cartridge 500 is kept with the shell 200. Each half 210 defines a slot 207. In the vertical slots 207 is inserted a latch 280 for entering the recess 508 in order to lock the cartridge 500. In a lower member of the shell 200 is defined an opening 206 through which a curved leaf spring 270 extends into the space 201 from the lower member of the shell 200. The latch 280 is in contact with the curved leaf spring 270.

The shell 200 includes an upper member (not numbered) in which is defined a slot 202 communicated with the space 201. A portion of the pusher 240 extends through the slot 202. On the shell 200 are formed two ears 203 in each of which an end of the rod 230 is fit. An ear 204 is formed on each half 210.

A hammering device includes a lever 300. To an end of the lever 300 is attached a flat head 311 for forcing a C-clip 620 onto a pin 700. At an opposite end of the lever 300 is formed an ear 301 connected with the ears 210 by means of a pin 610 engaged with a C-clip 620. An aperture 303 is defined in the lever 300. A recess 302 is defined in the top of the lever 300.

The apparatus 100 includes a handle 400. The handle 400 includes an upper member 402 for contact with a user's hand. On the upper member of the handle 400 are formed two restraints 403 for restraining the user's hand. Two lateral members 406 extend from the upper member 402.

An ear 401 extends from each lateral member 406. Each ear 401 is linked to one half 210 by means of a link 410. A pin 611 is inserted in an aperture 209 defined in each half 210 through an aperture (not numbered) defined in each link 410. Each ear 401 is put in a recess 208 defined in an external face of each lateral member 406.

A pin 613 is inserted in the aperture 303 through an aperture defined in each lateral member 406. A spring 420 is compressed between the lever 300 and the upper member 402. An end of the spring 420 is put in the recess 302. An opposite end of the spring 420 is put in a recess 405 defined in a lower face of the upper member 402.

Figure 4:
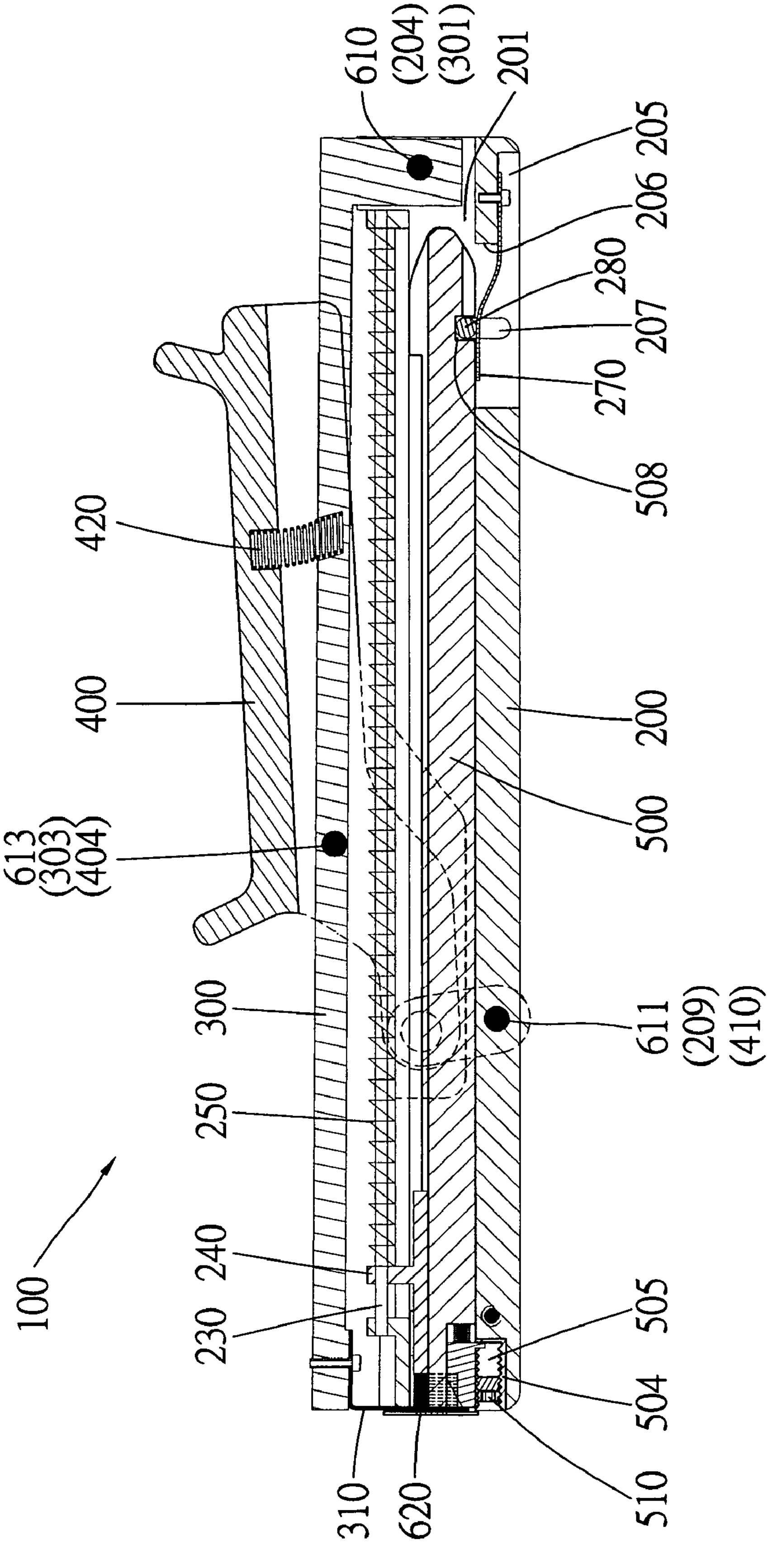
FIG. 4 is similar to FIG. 3 but shows the apparatus in another position.

In use, the latch 280 is moved from the recess 508. The cartridge 500 is pulled to the position shown in FIG. 3. The C-clips 620 are put on the saddle 520. The cartridge 500 is pushed into the shell 200. The slope 507 slides on and pushes down the latch 280. The cartridge 500 is moved to the position shown in FIG. 4. The latch 280 is forced into the recess 508 again by means of the curved leaf spring 270. Referring to FIG. 5, the pin 612 is put in the space 505. A groove 630 defined in the pin 612 is located right below the first C-clip 620. Referring to FIG. 4, the handle 400 is pushed down so that the lever 300 is pushed down. Referring to FIGS. 5 and 6, the flat head 310 pushes the first C-clip 620. The first C-clip 620 pushes the saddle 520 into the space 506 against the slope 521. Thus, the flat head 310 pushes the first C-clip 620 into the groove 630.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An apparatus for providing C-clips, the apparatus comprising:
- a cartridge for storing the C-clips, the cartridge comprising two lateral members and a lower member extending between the lateral members, wherein the lateral members extend beyond the lower member at least by the thickness of the C-clips so that first one of the C-clips can be moved past the lower member;
- a saddle movably connected with the lower member in order to carry some of the C-clips, the saddle comprising a slope for contact with the first one of the C-clip so that the saddle is moved as the first one of the C-clips is moved;
- a pocket connected with the cartridge below the saddle in order to receive a pin;
- a pusher put movably in the cartridge in order to push the C-clips;
- an elastic element for biasing the pusher;
- a shell for receiving the cartridge; and

- a hammering device for forcing the first C-clip onto the pin against the slope.

2. The apparatus according to claim 1 comprising an elastic element compressed between the lower member and the saddle.

3. The apparatus according to claim 2 comprising a rail extending from the lower member over the elastic element in order to guide the C-clips.

4. The apparatus according to claim 3 wherein the lateral members extend beyond the rail by the thickness of the C-clips.

5. The apparatus according to claim 1 comprising an adjustor put in the pocket for adjusting an effective length of the pocket for receiving the pins.

6. The apparatus according to claim 5 wherein the adjustor is a screw engaged with a thread formed on the internal side of the pocket.

7. The apparatus according to claim 5 wherein the saddle comprises a hook for hooking the adjustor in order to keep the saddle between the lateral members.

8. The apparatus according to claim 1 comprising a restraint provided in the shell, wherein each of the lateral members comprises a recess defined therein in order to receive the restraint so that the cartridge is movable in the shell but not removable from the shell.

9. The apparatus according to claim 1 comprising a restraint attached to the lateral members in order to keep the C-clips in the cartridge.

10. The apparatus according to claim 1 comprising a latch for locking the cartridge in the shell.

11. The apparatus according to claim 10 wherein the latch is movable between a locking position and a releasing position.

12. The apparatus according to claim 11 wherein the shell defines two slots for receiving the latch.

13. The apparatus according to claim 11 comprising an elastic element for biasing the latch to the locking position.

14. The apparatus according to claim 13 wherein the elastic element is a leaf spring comprising a first end attached to the shell and a second end in contact with the latch.

15. The apparatus according to claim 14 wherein the shell defines an opening, wherein the first end of the leaf spring is attached to an external face of the shell and the second end of the leaf spring contacts the latch in the shell.

16. The apparatus according to claim 10 wherein the lower member defines a recess for receiving the latch.

17. The apparatus according to claim 1 comprising an elastic element for biasing the pusher.

18. The apparatus according to claim 17 wherein the elastic element is a helical spring.

19. The apparatus according to claim 18 comprising a rod inserted through the helical spring.

20. The apparatus according to claim 19 wherein the shell comprises two ears for holding the rod.

21. The apparatus according to claim 1 wherein the shell comprises two halves.

22. The apparatus according to claim 1 wherein the hammering device comprises a lever pivotally connected with the shell and a flat head attached to an end of the lever in order to force the first C-clip onto the pin.

23. The apparatus according to claim 22 wherein the lever comprises an ear formed thereon, wherein the shell comprises at least one ear connected with the ear of the hammering device.

24. The apparatus according to claim 22 comprising a handle pivotally connected with the shell at a point and pivotally connected with the lever at another point.

25. The apparatus according to claim 24 comprising an elastic element put between the lever and the handle.

26. The apparatus according to claim 25 wherein the lever defines a recess in order to receive an end of the elastic element, wherein the handle defines a recess in order to receive an opposite end of the elastic element.

27. The apparatus according to claim 26 wherein the handle comprises two restraints formed on the upper member thereof in order to restrain a user's hand.

28. The apparatus according to claim 24 wherein the handle comprises two ears pivotally connected with the shell.

29. The apparatus according to claim 28 comprising two links each for linking one of the ears to the shell.

30. The apparatus according to claim 29 wherein the shell defines two recesses for receiving the ears so that the ears are in flush with the shell.

* * * * *